US012757126B2

(12) United States Patent
Kulkarni et al.

(10) Patent No.: US 12,757,126 B2
(45) Date of Patent: Oct. 6, 2026

(54) RADIO RESOURCE MANAGEMENT FOR Wi-Fi NETWORKS

(71) Applicant: Cisco Technology, Inc., San Jose, CA (US)

(72) Inventors: Santosh B. Kulkarni, Sunnyvale, CA (US); Vishal S. Desai, San Jose, CA (US); Pooya Monajemi, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 458 days.

(21) Appl. No.: 18/295,155

(22) Filed: Apr. 3, 2023

(65) Prior Publication Data

US 2024/0015664 A1 Jan. 11, 2024

Related U.S. Application Data

(60) Provisional application No. 63/368,015, filed on Jul. 8, 2022.

(51) Int. Cl.
*H04W 52/24* (2009.01)

(52) U.S. Cl.
CPC .................................. *H04W 52/248* (2013.01)

(58) Field of Classification Search
CPC .................................................. H04W 52/248
USPC ......................................................... 455/522
See application file for complete search history.

(56) References Cited

U.S. PATENT DOCUMENTS 7,346,364 B1 * 3/2008 Tsien ..................... H04B 17/29 455/70
10,111,206 B2 10/2018 Desai et al.
10,945,231 B1 3/2021 Henry et al.
2009/0286496 A1 11/2009 Yavuz et al.
2016/0077184 A1 3/2016 Steiner
2017/0374513 A1 12/2017 Venkatraman et al.
2018/0109970 A1 4/2018 Chu et al.
2019/0373301 A1 * 12/2019 Gunasekara ....... H04N 21/6405
2020/0128491 A1 4/2020 Drugge et al.
2021/0368287 A1 * 11/2021 Chen ........................ G07C 9/28
2022/0078727 A1 3/2022 Chennichetty et al.

FOREIGN PATENT DOCUMENTS

CN 1414715 A 4/2003
DE 102007031129 A1 1/2009
KR 20110036439 * 4/2011 ............ H04W 52/46
WO 2017007183 A1 1/2017

OTHER PUBLICATIONS

International Search Report and Written Opinion for International Application No. PCT/US2023/069614, mailed Dec. 7, 2023, 19 Pages.
Partial International Search Report for International Application No. PCT/US2023/069614, mailed Oct. 16, 2023, 9 Pages.

* cited by examiner

*Primary Examiner* — Sam K Ahn
(74) *Attorney, Agent, or Firm* — Patterson + Sheridan, LLP

(57) ABSTRACT

A method includes determining, based on (i) a transmit time and a receive time of a request packet from a first access point (AP) to a client device and (ii) a transmit time and a receive time of a response packet from the client device to the first AP, a distance between the first AP and the client device and adjusting a transmit power of the first AP based at least in part on the distance between the first AP and the client device.

10 Claims, 13 Drawing Sheets

RADIO RESOURCE MANAGEMENT FOR Wi-Fi NETWORKS

CROSS-REFERENCE TO RELATED APPLICATIONS

This application claims benefit of co-pending U.S. provisional patent application Ser. No. 63/368,015 filed Jul. 8, 2022. The aforementioned related patent application is herein incorporated by reference in its entirety.

TECHNICAL FIELD

Embodiments presented in this disclosure generally relate to wireless communication. More specifically, embodiments disclosed herein relate to radio resource management for wireless fidelity (WiFi) networks.

BACKGROUND

WiFi networks have been licensed to use the 6 GHz frequency band (which may also be referred to as WiFi 6E). WiFi 6E access points may operate in a standard power mode or a low power mode depending on whether the access points are installed outdoors or indoors and whether the access points will interfere with incumbent devices in the vicinity of the access points.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

Figure 1:
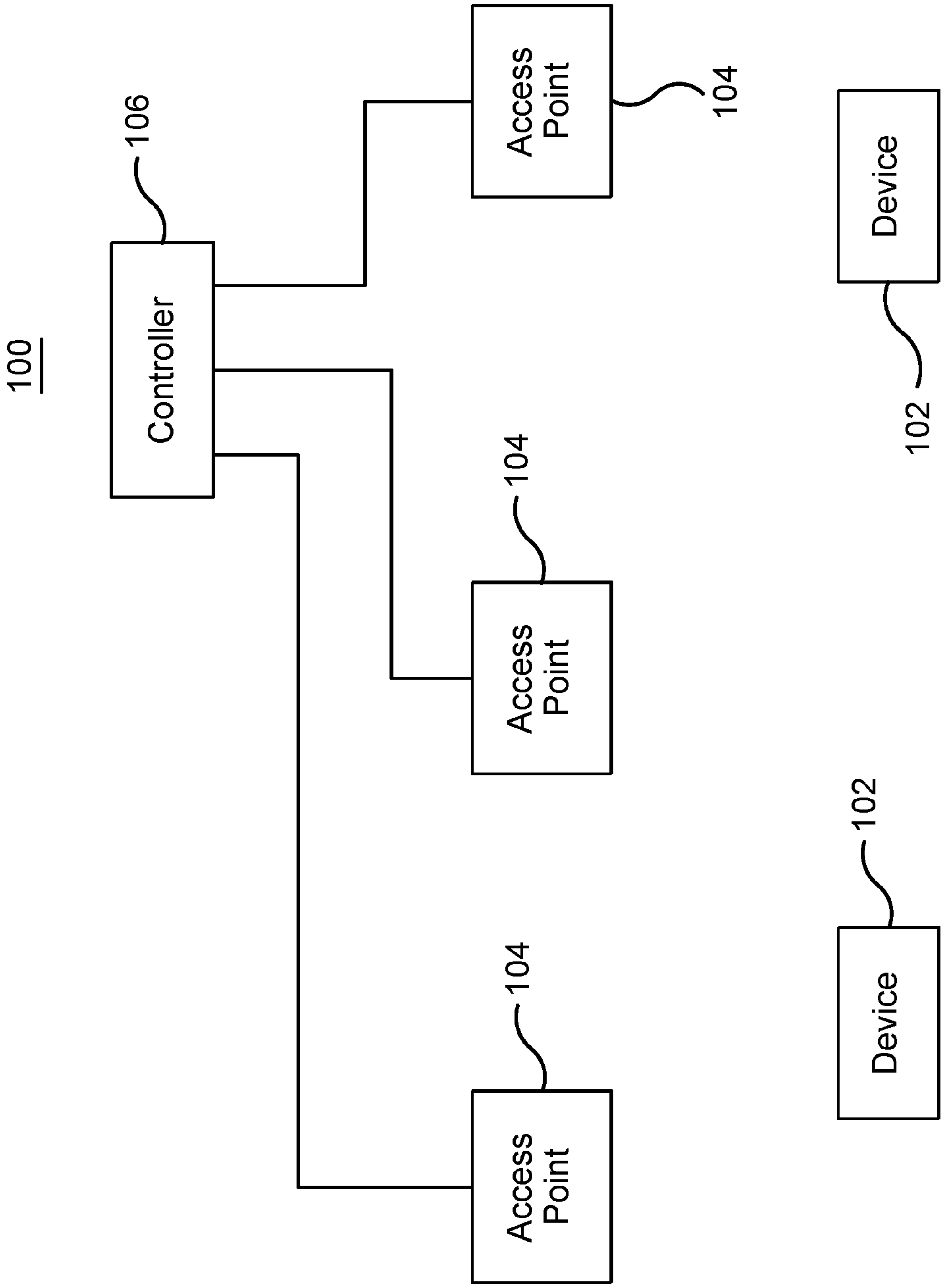
FIG. 1 illustrates an example system.

According to an embodiment, a method includes determining, based on (i) a transmit time and a receive time of a request packet from a first access point (AP) to a client device and (ii) a transmit time and a receive time of a response packet from the client device to the first AP, a distance between the first AP and the client device and adjusting a transmit power of the first AP based at least in part on the distance between the first AP and the client device.

According to another embodiment, a system includes a memory and a processor communicatively coupled to the memory. The processor determines, based on (i) a transmit time and a receive time of a request packet from a first access point (AP) to a client device and (ii) a transmit time and a receive time of a response packet from the client device to the first AP, a distance between the first AP and the client device and adjusts a transmit power of the first AP based at least in part on the distance between the first AP and the client device.

According to another embodiment, an apparatus includes a memory and a processor communicatively coupled to the memory. The processor determines, based on (i) a transmit time and a receive time of a request packet from a first access point (AP) to a client device and (ii) a transmit time and a receive time of a response packet from the client device to the first AP, a distance between the first AP and the client device, builds, based at least in part on the distance between the first AP and the client device, a model indicating a movement of the client device, and steers the client device to a second AP different from the first AP based at least in part on the movement of the client device.

Example Embodiments

Wireless fidelity (WiFi) 6E access points are allowed to operate in a standard power mode and a low power mode depending on whether the access points are installed outdoors or indoors and whether the access points will interfere with incumbent devices in the vicinity of the access points. In the standard power mode, the access points use a higher transmission power than when the access points are operating in the low power mode. Thus, different access points in a WiFi 6E deployment may use different transmission powers. The user devices connected to these access points may report their respective received signal strength indicators (RSSIs), but, as a result of the different access point transmission powers, these RSSI values may no longer be a good or accurate indicator of distance between the user devices and the access points. Therefore, in a WiFi 6E system, it may be more challenging to evaluate the distance between access points and the distance between client devices and the access points, which may make it more challenging to determine what transmission power each access point should use.

The present disclosure describes a wireless network that uses fine timing measurement (FTM) to determine distances between access points or distances between access points and client devices. The wireless network may then use these determined distances to manage the power used by the access points in the network. For example, the distances may be used to determine when to switch certain access points from operating in a standard power mode to a low power mode. As another example, the distances may be used to determine when to steer devices to access points operating in a low power mode. As yet another example, the distances may be used to determine what modulation scheme an access point should use. In some embodiments, the wireless network conserves electric power by switching certain access points to the low power mode when possible.

FIG. 1 illustrates an example system 100. As seen in FIG. 1, the system 100 includes one or more devices 102, one or more access points 104, and a controller 106. Generally, the devices 102 connect to one or more of the access points 104. The access points 104 provide network coverage for the system 100. The access points 104 communicate messages to the devices 102 and direct messages from the devices 102 towards their destination. In certain embodiments, the controller 106 and the access points 104 use FTM to determine distances between the access points 104 and distances between the access points 104 and the devices 102. These distances may then be used to adjust the operating modes of the access points 104 and the connections in the system 100.

The device 102 may be any suitable device that wirelessly connects to one or more access points 104. As an example and not by way of limitation, the device 102 may be a computer, a laptop, a wireless or cellular telephone, an electronic notebook, a personal digital assistant, a tablet, or any other device capable of receiving, processing, storing, or communicating information with other components of the system 100. The device 102 may be a wearable device such as a virtual reality or augmented reality headset, a smart watch, or smart glasses. The device 102 may also include a user interface, such as a display, a microphone, keypad, or other appropriate terminal equipment usable by the user. The device 102 may include a hardware processor, memory, or circuitry configured to perform any of the functions or actions of the device 102 described herein. For example, a software application designed using software code may be stored in the memory and executed by the processor to perform the functions of the device 102.

The access point 104 facilitates wireless communication in the system 100. One or more devices 102 may connect to the access point 104. The access point 104 may then facilitate wireless communication for the connected devices 102. For example, the access point 104 may transmit messages to a connected device 102. As another example, the access point 104 may receive messages transmitted by the device 102. The access point 104 may then direct that message towards its intended destination.

The access point 104 may operate in a standard power mode or a low power mode depending on whether the access point 104 is installed outdoors or indoors and depending on whether the access point 104 will interfere with incumbent devices in the vicinity of the access point 104. When operating in the standard power mode, the access point 104 may transmit messages using a higher power than when the access point 104 is operating in the low power mode. Additionally, when the access point 104 is operating in the standard power mode, the access point 104 may use more electric power than when the access point 104 operates in the low power mode. Because the access point 104 may transmit messages using different transmission powers, the RSSI of a connected device 102 may not be a suitable indicator of the physical distance between the device 102 and the access point 104. For example, a device 102 may be closer to an access point 104 operating in the low power mode but detect a higher RSSI with an access point 104 that is further away but operating in the standard power mode.

The access point 104 may use FTM to determine a distance between the access point 104 and the device 102 or a distance between the access point 104 and another access point 104. Generally, during FTM, the access point 104 may exchange timing messages and acknowledgements with the device 102 or the other access point 104. The access point 104 may determine the times at which the timing messages and acknowledgements were received by the access point 104 or the device 102. These times may then be used to determine the physical distances from the access point 104 to the device 102 or the other access point 104. The physical distance may be used to adjust the operating mode of the access point 104 or the connections within the system 100, in particular embodiments.

The controller 106 may be a network controller that facilitates or manages the access points 104. In some embodiments, the controller 106 is integrated within one or more of the access points 104. The controller 106 may determine the physical distance between access points 104 or the physical distance between a device 102 and an access point 104. For example, the controller 106 may analyze the times at which timing messages and acknowledgements exchanged between access points 104 or between an access point 104 and a device 102 were received. The controller 106 may then calculate the physical distance between the access points 104 or between the access point 104 and the device 102 using these times. For example, the more time that it takes for timing messages and acknowledgements to be received, the greater the physical distance between the access points 104 or between the access point 104 and the device 102.

The controller 106 may adjust an operating mode of the access point 104 or connections within the system 100 based on the determined distances between the access points 104 or the distances between the access point 104 and the device 102. For example, if the controller 106 determines that the devices 102 connected to an access point 104 are or will be physically near the access point 104, then the controller 106 may cause the access point 104 to operate in the low power mode. Because the connected devices 102 are physically near the access point 104, the communications between the access point 104 and the devices 102 may remain successful even though the access point 104 is transmitting in the low power mode. As a result of operating in the low power mode, the access point 104 conserves electric power while maintaining communication with the devices 102, in certain embodiments.

As another example, if the controller 106 determines that a connected device 102 is moving towards the edge of the coverage area of the access point 104 when the access point 104 is operating in the low power mode, then the controller 106 may determine whether the coverage area overlaps with the coverage area of another access point 104. If there is overlap in the coverage areas, the controller 106 may steer the device 102 to connect to the other access point 104, which allows the access point 104 to remain operating in the low power mode. If there is no overlap in coverage area, then the controller 106 may adjust the access point 104 to operate in the standard power mode. As a result, the device 102 may maintain communication with an access point 104, even though the device 102 is moving near the boundary of the coverage area of the access point 104 in low power mode.

As another example, the controller 106 may adjust the access point 104 to operate in the standard power mode when the controller 106 determines that there is a hole in the coverage area of the access point 104 operating in the low power mode. The controller 106 may initially increase the transmission power of the access point 104 when the hole in the coverage area is detected. If the access point 104 is operating at the highest transmission power in the low power mode and the hole in the coverage area still exists, then the controller 106 may instruct the access point 104 to switch to the standard power mode. By switching to the standard power mode, the access point 104 may transmit at even higher powers, which may resolve the hole in the coverage area.

As another example, the controller 106 may track the number of devices 102 that are connected to the access points 104 at different times of the day. The controller 106 may use this information to predict when there will be no devices 102 or few devices 102 connected to the access points 104. During these times, the controller 106 may adjust the access points 104 to operate in the low power mode to conserve electric power.

As another example, the controller 106 may use the determined distances between the access points 104 and the device 102 along with the transmission power of the device 102 and the RSSI of the device 102 to adjust a modulation scheme for the access point 104 and the device 102. The controller 106 may build a model indicating path loss between the access point 104 and the device 102 using the determined distance, the transmission power of the device 102, and the RSSI of the device 102. The controller 106 may use this model to predict path loss for the device 102. The controller 106 may then choose a suitable modulation scheme to handle or resolve the predicted path loss.

As another example, the controller 106 may use the determined distances between the access points 104 when steering the device 102 to connect to a particular access point 104. When the device 102 is selecting an access point 104 for a connection, the controller 106 may artificially boost the RSSIs of the access points 104 that are close to the device 102 and are operating in the low power mode. As a result, the RSSIs of these access points 104 may be fairly compared with the RSSIs of the access points 104 that are further away from the device 102 but operating in the standard power mode. The device 102 may review the resulting RSSIs and select an access point 104 for connection. In this manner, the controller 106 may allow the access points 104 that are operating in the low power mode to be fairly considered by the device 102 for connection.

Figure 2:
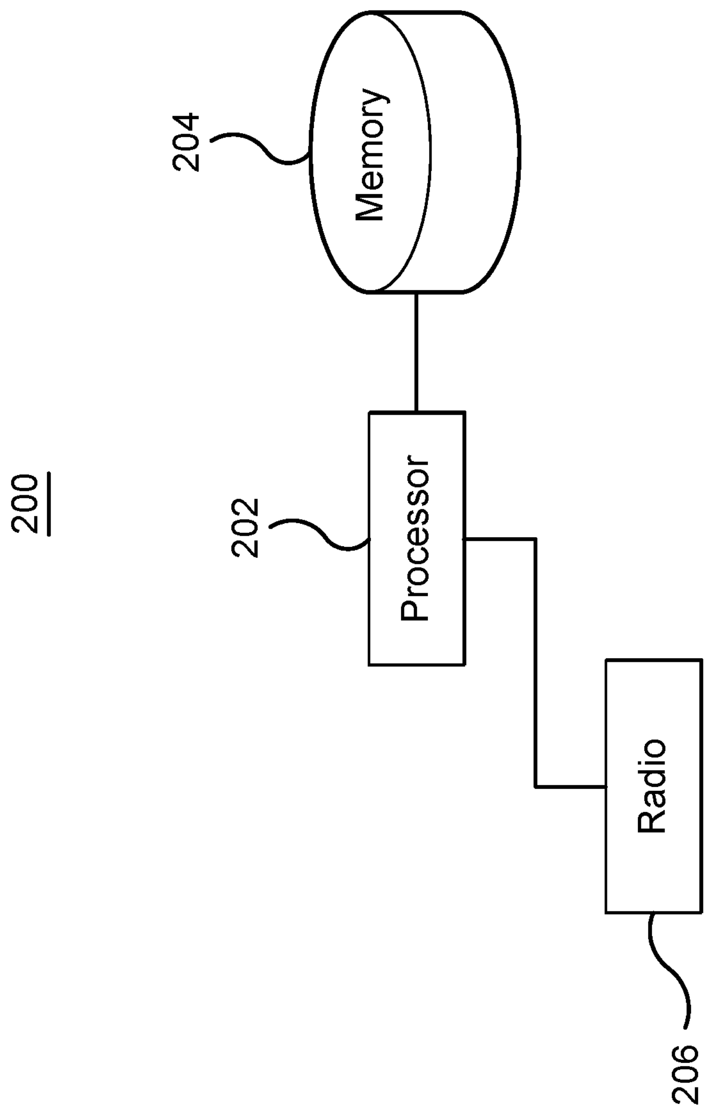
FIG. 2 illustrates an example system.

FIG. 2 illustrates an example system 200. As seen in FIG. 2, the system 200 includes a processor 202, a memory 204 and a radio 206. The system 200 may be embodied in the devices 102, the access points 104, and/or the controller 106. In other words, each device 102, each access point 104, and the controller 106 may include a processor 202, a memory 204, and/or a radio 206. In embodiments where the controller 106 is embodied in an access point 104, the controller 106 and the access point 104 may use the same processor 202, memory 204, and/or radio 206. The processor 202, the memory 204 and the radio 206 may perform the functions or actions of the devices 102, the access points 104, and/or the controller 106.

The processor 202 is any electronic circuitry, including, but not limited to one or a combination of microprocessors, microcontrollers, application specific integrated circuits (ASIC), application specific instruction set processor (ASIP), and/or state machines, that communicatively couples to memory 204 and controls the operation of the device 102, the access point 104, and/or the controller 106. The processor 202 may be 8-bit, 16-bit, 32-bit, 64-bit or of any other suitable architecture. The processor 202 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The processor 202 may include other hardware that operates software to control and process information. The processor 202 executes software stored on the memory 204 to perform any of the functions described herein. The processor 202 controls the operation and administration of the device 102, the access point 104, and/or the controller 106 by processing information (e.g., information received from the devices 102, access points 104, controller 106, and memory 204). The processor 202 is not limited to a single processing device and may encompass multiple processing devices.

The memory 204 may store, either permanently or temporarily, data, operational software, or other information for the processor 202. The memory 204 may include any one or a combination of volatile or non-volatile local or remote devices suitable for storing information. For example, the memory 204 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in the memory 204, a disk, a CD, or a flash drive. In particular embodiments, the software may include an application executable by the processor 202 to perform one or more of the functions described herein.

The system 200 may include any suitable number of radios 206. Each radio 206 may transmit and receive wireless messages. The radios 206 may also be used to form wireless connections with other radios 206. In some embodiments, the radios 206 may transmit the wireless messages using any suitable transmission power. For example, the radios 206 may transmit messages using standard power or low power.

Figure 3:
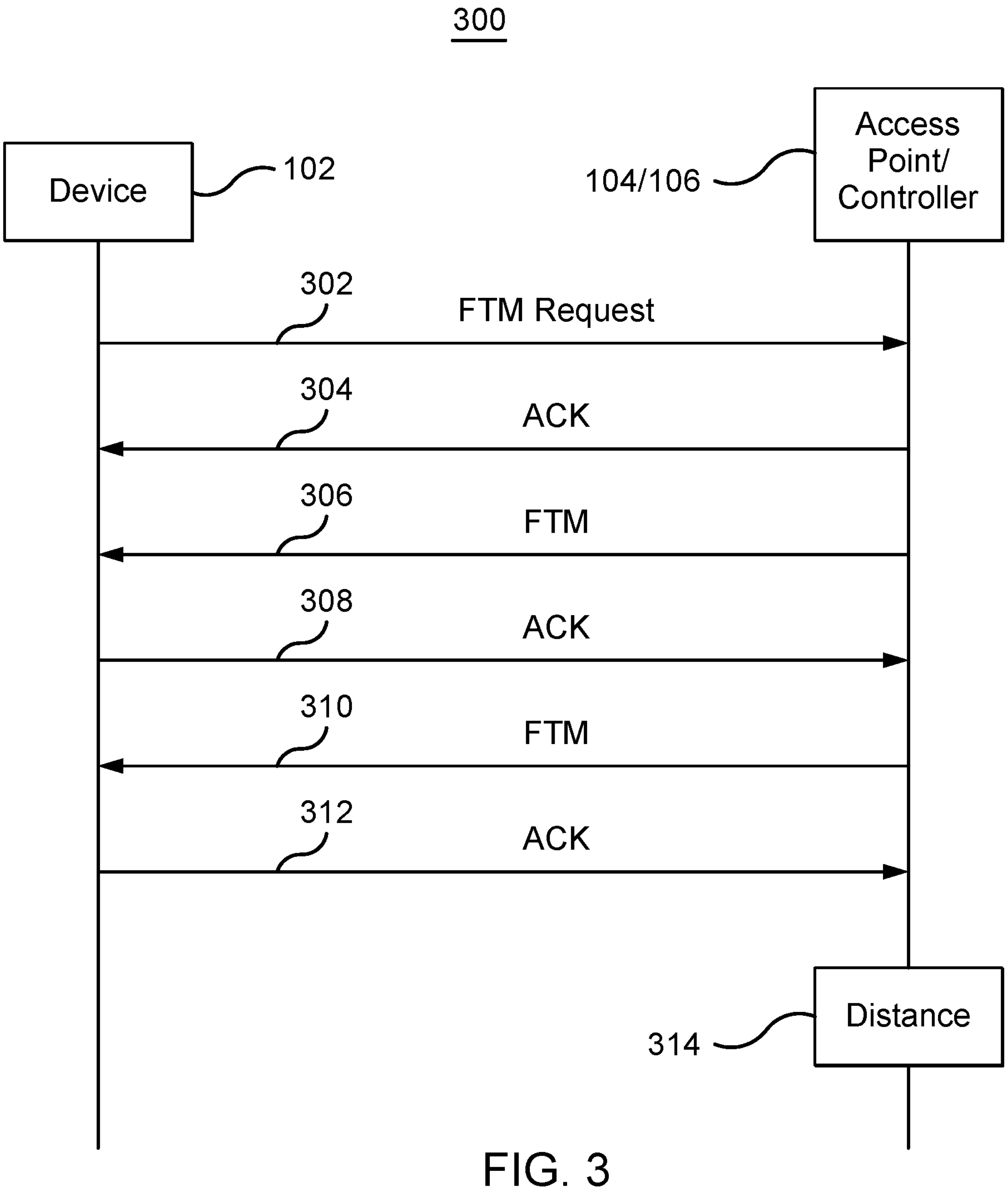
FIG. 3 illustrates an example process for determining distance in the system of FIG. 1.

FIG. 3 illustrates an example process 300 for determining distances in the system 100 of FIG. 1. As seen in FIG. 3, the process 300 may be performed using a device 102, an access point 104, and the controller 106. The controller 106 may be embodied within the access point 104. In particular embodiments, by performing the process 300, the access point 104 and the controller 106 may determine a distance between the device 102 and the access point 104. The same process 300 may be performed by access points 104 to determine the distance between the access points 104.

The process 300 begins when the device 102 communicates a FTM request 302 to the access point 104 or the controller 106. The FTM request 302 may trigger the access point 104 or the controller 106 to initiate the FTM process. The access point 104 or the controller 106 transmits an acknowledgement 304 to the FTM request 302 to the device 102.

The access point 104 or the controller 106 initiate the FTM process by communicating an FTM signal 306 to the device 102. When the device 102 receives the FTM signal 306, the device 102 responds with an acknowledgement 308 to the access point 104 or the controller 106. The acknowledgement 308 may indicate the time at which the FTM signal 306 was received by the device 102. The acknowledgement 308 may also indicate the time at which the device 102 sent the acknowledgement 308. The access point 104 or the controller 106 may also note the time at which the acknowledgement 308 was received by the access point 104 or the controller 106. Thus, the access point 104 or the controller 106 may know the times when the FTM signal 306 was transmitted, when the FTM signal 306 was received by the device 102, when the device 102 transmitted the acknowledgement 308, and when the access point 104 or the controller 106 received the acknowledgement 308. The access point 104 or the controller 106 may use these times to calculate a distance 314 between the device 102 and the access point 104.

In some embodiments, the access point 104 or the controller 106 may perform additional rounds of the FTM process to determine a more accurate distance 314 between the device 102 and the access point 104. In the example of FIG. 3, the access point 104 or the controller 106 communicate another FTM signal 310 to the device 102. The device 102 responds with another acknowledgement 312 to the access point 104 or the controller 106. The access point 104 or the controller 106 may again track the times at which the FTM signal 310 and the acknowledgement 312 were sent and received. The access point 104 or the controller 106 may then use these times to adjust or update the distance 314. Generally, as more rounds of the FTM process are performed, the more accurate the determined distance 314 between the device 102 and the access point 104.

The access point 104 and the controller 106 may perform different portions of the process 300. For example, the access point 104 may be responsible for sending FTM signals to the device 102 and for receiving acknowledgements from the device 102. The access point 104 may report to the controller 106 the times at which the FTM signals and acknowledgement were sent and received. The controller 106 may use these times to calculate the distance 314.

Figure 4:
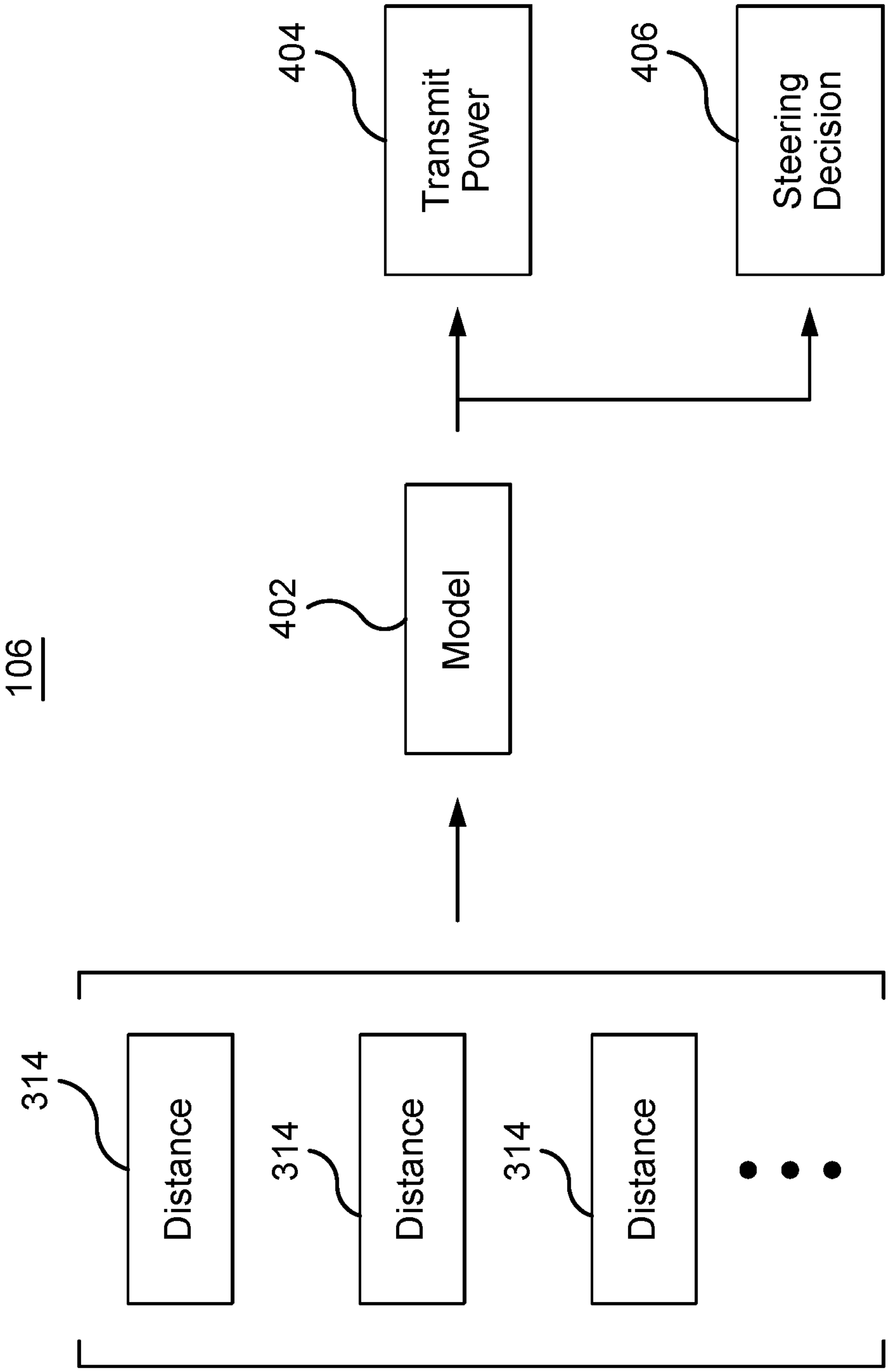
FIG. 4 illustrates an example controller in the system of FIG. 1.

FIG. 4 illustrates an example controller 106 in the system 100 of FIG. 1. Generally, FIG. 4 shows the controller 106 using determined distances 314 between an access point 104 and a device 102 to control the operation of the access point 104. In particular embodiments, the controller 106 adjusts an operating mode of the access point 104, which conserves electric power.

The controller 106 determines one or more distances 314 between a device 102 and an access point 104. As discussed previously, the controller 106 may use FTM signaling to determine the physical distance 314 between the device 102 and the access point 104. The controller 106 may determine the distance 314 between the device 102 and the access point 104 at different times resulting in the multiple distances 314 shown in the example of FIG. 4.

The controller 106 may analyze the distances 314 to build a model 402. The model 402 may indicate the movement of the device 102 near or around the access point 104. The controller 106 may use the model 402 to determine or predict how the device 102 will move at certain times. For example, the controller 106 may use the model 402 to predict when the device 102 will move into or out of coverage of the access point 104. As another example, the controller 106 may use the model 402 to determine or predict when the device 102 will move closer or further away from the access point 104.

The controller 106 may determine distances 314 and a model 402 for multiple devices 102 that connect to the access point 104. The controller 106 may use FTM signaling to determine the distances 314 between the devices 102 and the access point 104. The controller 106 may then build the model 402 using the determined distances 314. The controller 106 may then use the model 402 to determine or predict the movement of any one of the devices 102.

The controller 106 may use the determinations or predictions from the model 402 to adjust the operation of the access point 104. For example, the controller 106 may use the model 402 to determine or predict when a device 102 will move closer to or further away from the access point 104. When the controller 106 predicts that the device 102 will be near the access point 104 (e.g., within a threshold distance of the access point 104), the controller 106 may adjust the transmit power 404 of the access point 104. For example, the controller 106 may instruct the access point 104 to operate in the low power mode instead of the standard power mode, which would reduce the transmission power and electrical power consumption of the access point 104. As another example, the controller 106 may instruct the access point 104 to reduce its transmit power 404 when the controller 106 predicts that the device 102 will be near the access point 104 (e.g., within a threshold distance of the access point 104). When the controller 106 predicts that the device 102 will move further away from the access point 104, the controller 106 may instruct the access point 104 to increase the transmit power 404. The controller 106 may also instruct the access point 104 to operate in the standard power mode instead of the low power mode. As a result, the access point 104 increases the transmit power 404 so that the access point 104 may remain in communication with the device 102.

As another example, the controller 106 may predict when the device 102 will move to the edge of the coverage area of the access point 104 when the access point 104 is operating in the low power mode. The controller 106 may determine that there is overlap in the coverage area of the access point 104 and the coverage area of another access point 104. In response, the controller 106 may make a steering decision 406 to steer the device 102 to connect to the other access point 104 when the device 102 is predicted to move towards the edge of the coverage area of the access point 104 when the access point 104 is operating in the low power mode. As a result, the device 102 may connect to the other access point 104, which allows the access point 104 to remain operating in the low power mode. If the controller 106 determines there is no overlap in coverage area, then the controller 106 may instruct the access point 104 to increase the transmit power 404 or to operate in the standard power mode.

Figure 5:
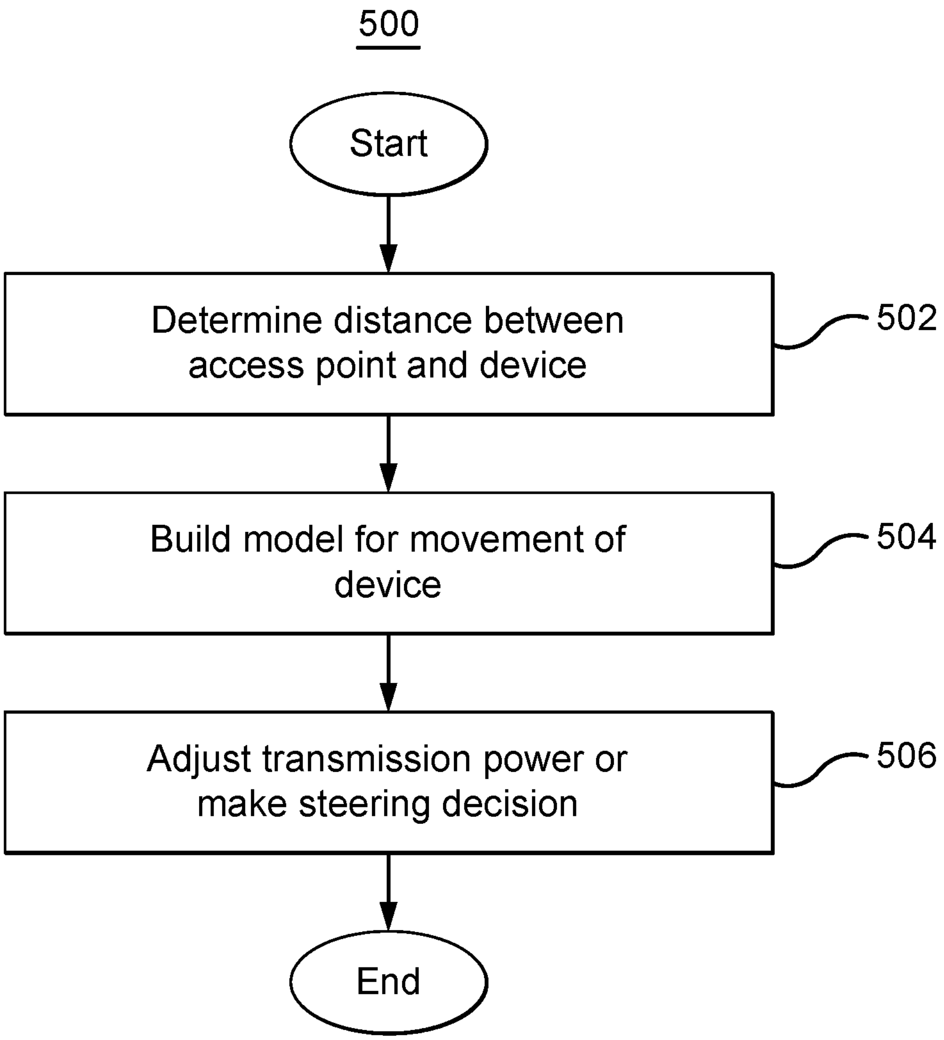
FIG. 5 is a flowchart of an example method performed in the system of FIG. 1.

FIG. 5 is a flowchart of an example method 500 performed in the system 100 of FIG. 1. In particular embodiments, the access point 104 or the controller 106 may perform the method 500. By performing the method 500, the access point 104 or the controller 106 conserves electric power, in particular embodiments.

In block 502, the access point 104 or the controller 106 determines a distance 314 between the access point 104 and the device 102. The access point 104 or the controller 106 may use FTM signaling, as shown in the example of FIG. 3, to determine the distance 314 between the access point 104 and the device 102. In block 504, the access point 104 or the controller 106 build the model 402 that indicates the movement of the device 102. The access point 104 or the controller 106 may use the determined distances 314 between the device 102 and the access point 104 over time to build the model 402. The model 402 may then be used to determine or predict the movement of the device 102.

In block 506, the access point 104 or the controller 106 adjusts a transmit power 404 or makes a steering decision 406. The access point 104 or the controller 106 may adjust the transmit power 404 or make the steering decision 406 based on the determined or predicted movement of the device 102. For example, if the access point 104 or the controller 106 predicts that the device 102 will be near the access point 104 at a particular time (e.g., within a threshold distance of the access point 104), then the access point 104 or the controller 106 may reduce the transmit power 404 at that time. The access point 104 may even operate in a low power mode at that time. As another example, if the access point 104 or the controller 106 predict that the device 102 will move further away from the access point 104, then the access point 104 or the controller 106 may increase the transmit power 404. The access point 104 may even operate in the standard power mode.

As another example, if the access point 104 or the controller 106 predict that the device 102 will move to the edge of a coverage area of the access point 104 when the access point 104 is operating in the low power mode, and if the access point 104 or the controller 106 determine that there is overlap in the coverage area with the coverage area of another access point 104, then the access point 104 or the controller 106 may make the steering decision 406 to have the device 102 connect to the other access point 104. As a result, the device 102 may connect to the other access point 104 when the device 102 moves to the edge of the coverage area, which allows the access point 104 to remain operating in the low power mode, conserving electric power.

Figure 6:
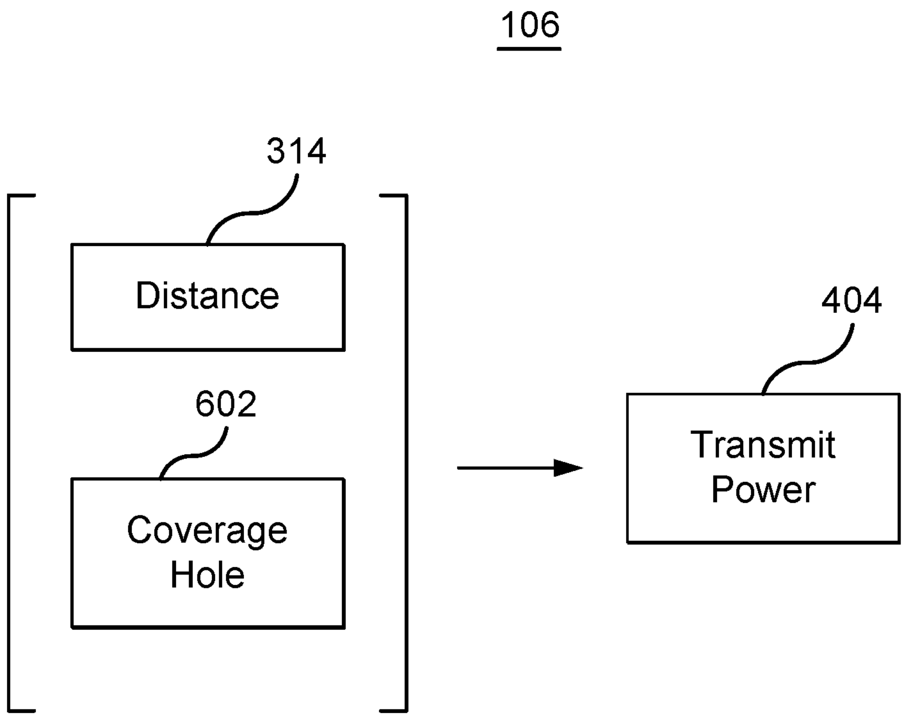
FIG. 6 illustrates an example controller in the system of FIG. 1.

FIG. 6 illustrates an example controller 106 in the system 100 of FIG. 1. As seen in FIG. 6, the controller 106 may adjust the transmit power 404 of an access point 104 when a coverage hole 602 is reported for the access point 104.

The controller 106 may determine the distance 314 between a device 102 and an access point 104 using FTM signaling, as shown in FIG. 3. The controller 106 may also determine that a coverage hole 602 for the access point 104 has been reported. When the controller 106 determines or predicts that the device 102 will be near or located in the coverage hole, the controller 106 may adjust the transmit power 404 of the access point 104. For example, the controller 106 may increase the transmit power 404 to fix or resolve the coverage hole. If the access point 104 is capable of operating in the standard power mode, the controller 106 may instruct the access point 104 to operate in the standard power mode to fix or resolve the coverage hole. In some embodiments, the controller 106 gradually increases the transmit power 404 of the access point 104 until the transmit power 404 is at the maximum allowed transmit power for the low power mode. The controller 106 may then instruct the access point 104 to transition to the standard power mode and to further increase the transmit power 404 if the coverage hole is not resolved at the maximum transmit power 404 for the low power mode.

In some embodiments, the controller 106 may adjust the transmit power 404 based solely on the detection or reporting of the coverage hole 602. For example, if the controller 106 determines that the access point 104 is operating in the low power mode when the coverage hole 602 is reported or detected, the controller 106 may instruct the access point 104 to increase the transmit power 404. The access point 104 may then gradually increase the transmit power 404. If increasing the transmit power 404 does not fix or resolve the coverage hole 602, the controller 106 may instruct the access point 104 to operate in the standard power mode instead of the low power mode. The access point 104 may then transition to the standard power mode and further increase the transmit power 404 until the maximum transmit power 404 is reached or until the coverage hole 602 is fixed or resolved.

Figure 7:
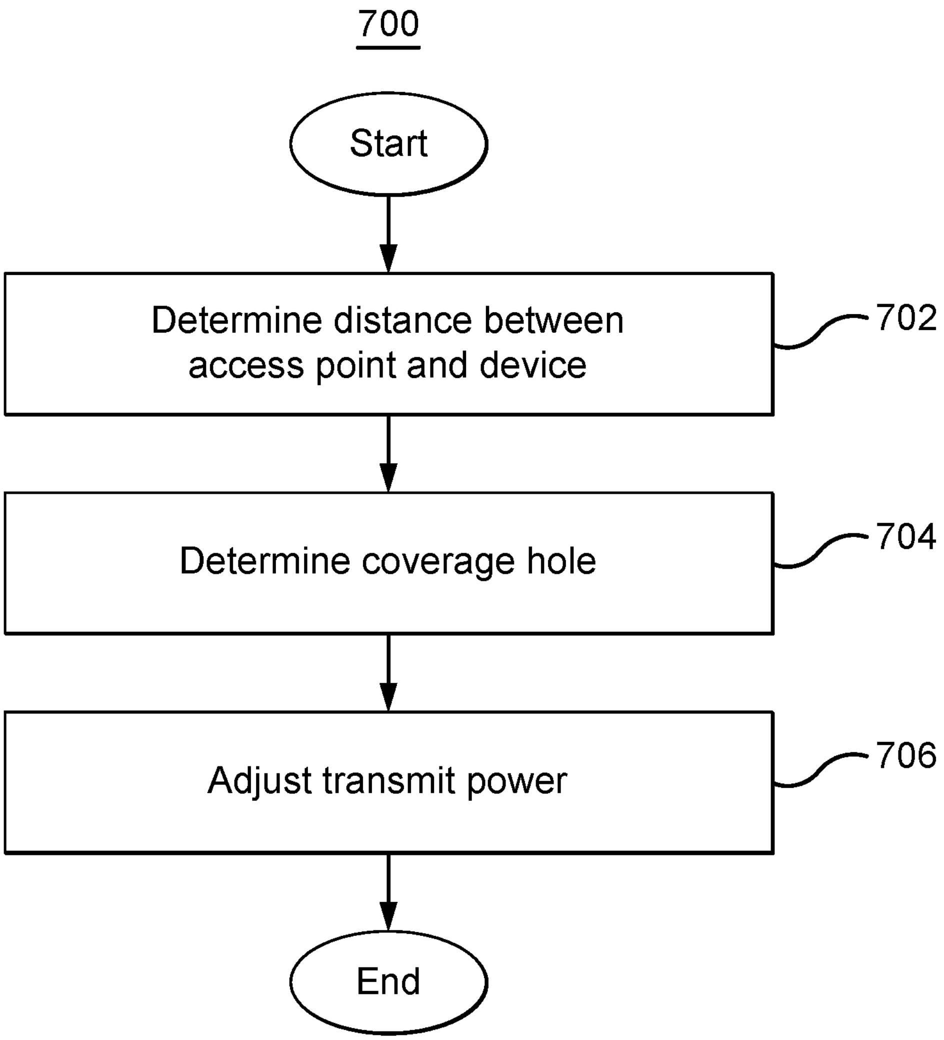
FIG. 7 is a flowchart of an example method performed in the system of FIG. 1.

FIG. 7 is a flowchart of an example method 700 performed in the system 100 of FIG. 1. In particular embodiments, an access point 104 or the controller 106 performs the steps of the method 700. By performing the method 700, a coverage hole may be fixed or resolved.

In block 702, the access point 104 or the controller 106 determines a distance 314 between the access point 104 and the device 102. The access point 104 or the controller 106 may use FTM signaling, as shown in FIG. 3, to determine the distance 314. In block 704, the access point 104 or the controller 106 determines a coverage hole 602 for the access point 104. The coverage hole 602 may be detected or reported. For example, the device 102 may detect the coverage hole 602 and report the coverage hole 602 to the access point 104 or the controller 106.

In block 706, the access point 104 or the controller 106 adjusts the transmit power 404 of the access point 104. The access point 104 or the controller 106 may increase the transmit power 404 to try to resolve or fix the coverage hole 602. The access point 104 may increase the transmit power 404 up to the maximum allowed transmit power 404 for the low power mode. If the coverage hole 602 is not resolved or fixed, then the access point 104 may switch to operating in the standard power mode and further increase the transmit power 404 until the coverage hole 602 is fixed or resolved. In some instances, the access point 104 or the controller 106 may use the distance 314 to determine whether the device 102 is near or in the coverage hole. The access point 104 or the controller 106 may then increase the transmit power 404 if the device 102 is near or in the coverage hole.

Figure 8:
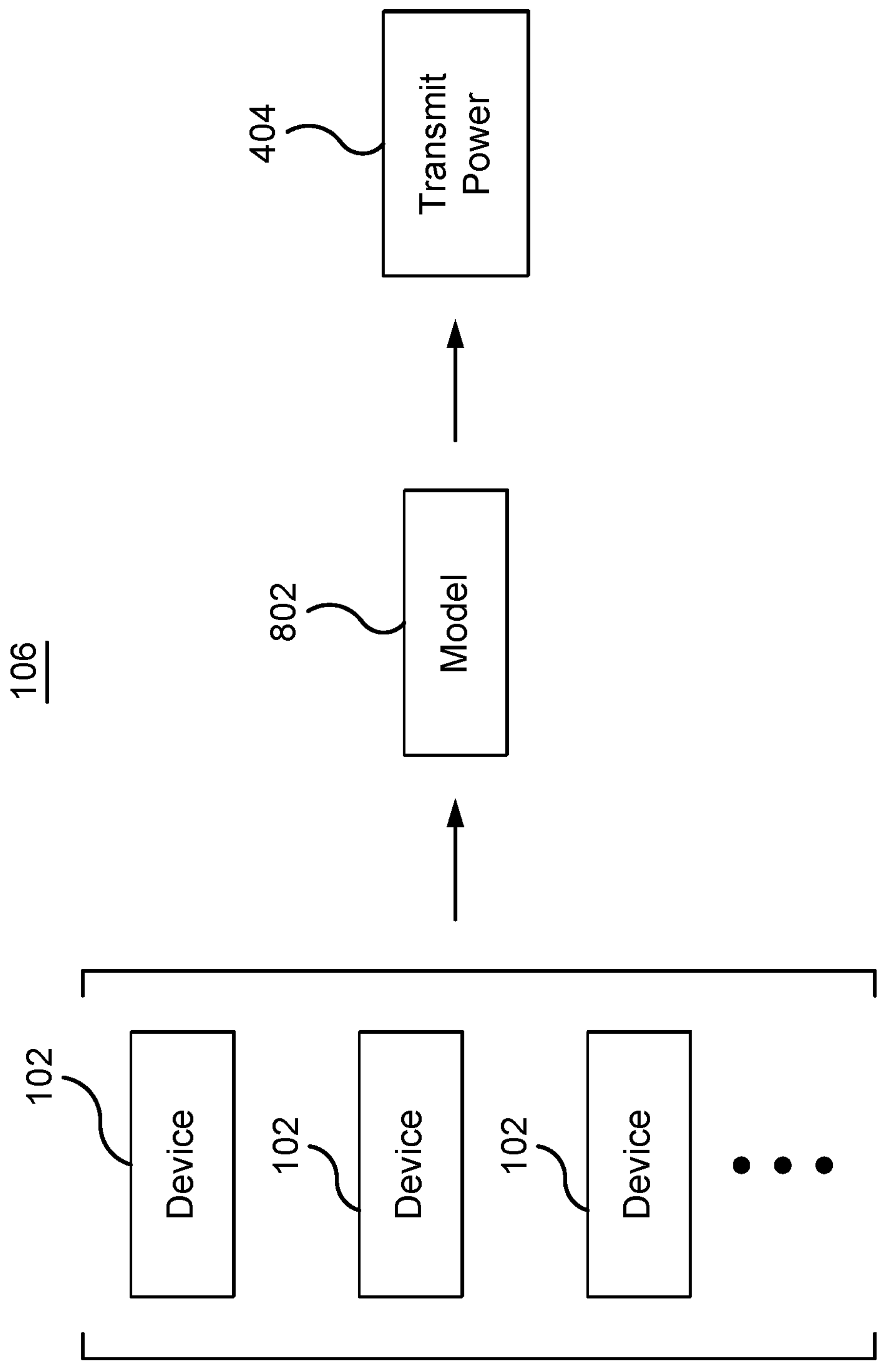
FIG. 8 illustrates an example controller in the system of FIG. 1.

FIG. 8 illustrates an example controller 106 in the system 100 of FIG. 1. Generally, FIG. 8 shows the controller 106 adjusting the transmit power 404 of an access point 104 based on a number of connected devices 102.

The controller 106 may determine and track the number of devices 102 that are connected to the access point 104 at different times. The controller 106 uses the history of the number of connected devices 102 to build a model 802. The model 802 may indicate the number of devices 102 connected to the access point 104 at different times. The controller 106 may use the model 802 to determine or predict the number of devices 102 that will be connected to the access point 104 at different times.

The controller 106 adjusts the transmit power 404 of the access point 104 based on the predictions made using the model 802. For example, if the controller 106 predicts that no or few devices 102 will be connected to the access point 104 at a particular time, then the controller 106 may reduce the transmit power 404 of the access point 104 at that time. In some embodiments, the controller 106 may instruct the access point 104 to operate in the low power mode instead of the standard power mode, which reduces the transmit power 404 of the access point 104. In this manner, the controller 106 conserves electric power when no or few devices 102 are expected to be connected to the access point 104.

Figure 9:
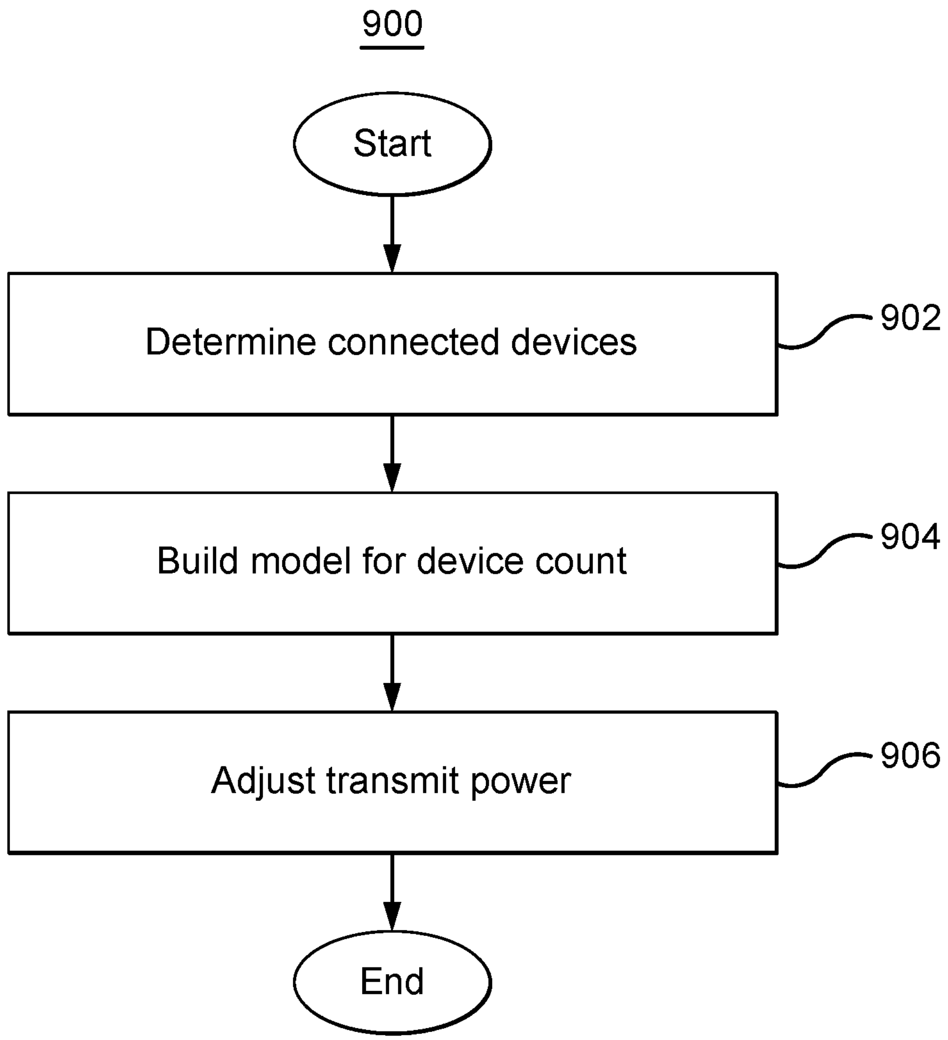
FIG. 9 is a flowchart of an example method performed in the system of FIG. 1.

FIG. 9 is a flowchart of an example method 900 performed in the system 100 of FIG. 1. In certain embodiments, the access point 104 or the controller 106 perform the method 900. By performing the method 900, the access point 104 or the controller 106 adjusts the transmit power 404 of the access point 104 based on the number of expected connections at the access point 104.

In block 902, the access point 104 or the controller 106 determines the number of connected device 102. For example, the access point 104 or the controller 106 may count the number of devices 102 connected to the access point 104. The access point 104 or the controller 106 may determine the number of connected devices 102 across different periods of time. In block 904, the access point 104 or the controller 106 builds the model 802 that indicates the number of connected devices 102. The access point 104 or the controller 106 may use the model 802 to determine or predict the number of connected devices 102 at different times.

In block 906, the access point 104 or the controller 106 adjusts the transmit power 404 of the access point 104 based on the predictions made using the model 802. For example, if the access point 104 or the controller 106 predict that no or few devices 102 will be connected to the access point 104 at a particular time, then the access point 104 or the controller 106 may reduce the transmit power 404 at that time. For example, the access point 104 may operate in the low power mode instead of the standard mode during that time, which conserves electric power.

Figure 10:
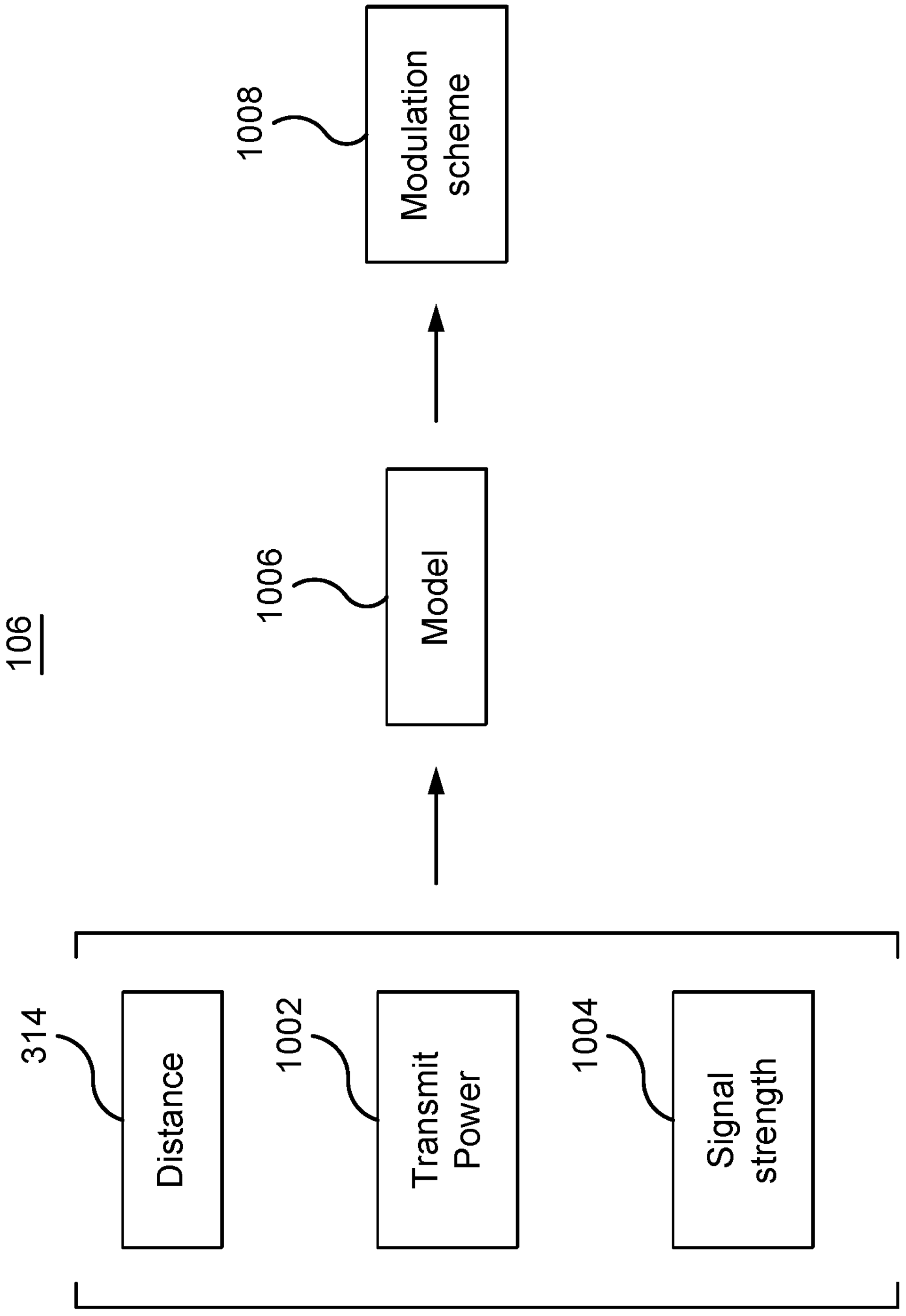
FIG. 10 illustrates an example controller in the system of FIG. 1.

FIG. 10 illustrates an example controller 106 in the system 100 of FIG. 1. Generally, FIG. 10 shows the controller 106 selecting a modulation scheme for an access point 104 and a device 102. In particular embodiments, the controller 106 may select the modulation scheme based at least in part on the distance 314 between the access point 104 and the device 102.

The controller 106 may determine the distance 314 between the access point 104 and the device 102 using FTM signaling, as shown in FIG. 3. The controller 106 may also determine the transmit power 1002 of the device 102 and a signal strength 1004 of the device 102. The signal strength 1004 may be in the form of an RSSI reported by the device 102.

The controller 106 builds a model 1006 using the distance 314, the transmit power 1002, and the signal strength 1004. The model 1006 may indicate a path loss of the device 102. The controller 106 may use the model 1006 to predict the path loss of the device 102 or to explain an observed path loss of the device 102. In some instances, the controller 106 uses the model 1006 to estimate or predict the RSSI and signal-to-noise ratio (SNR) values for the device 102 at different times.

The controller 106 then selects a modulation scheme 1008 for the access point 104 and the device 102 based on the predictions made using the model 1006. The controller 106 may select the modulation scheme 1008 that allows safe and successful communication between the access point 104 and the device 102. For example, the controller 106 may select the modulation scheme 1008 that provides for successful communication given the predicted RSSI or SNR values of the device 102. The controller 106 may predict that the device 102 will be close to the access point 104. The controller 106 may select the modulation scheme 1008 that allows for successful communication even though the RSSI of the device 102 may be low. The controller 106 may assume that the device 102 will communicate successfully with the access point 104 even at low RSSI because the device 102 is close to the access point 104.

Figure 11:
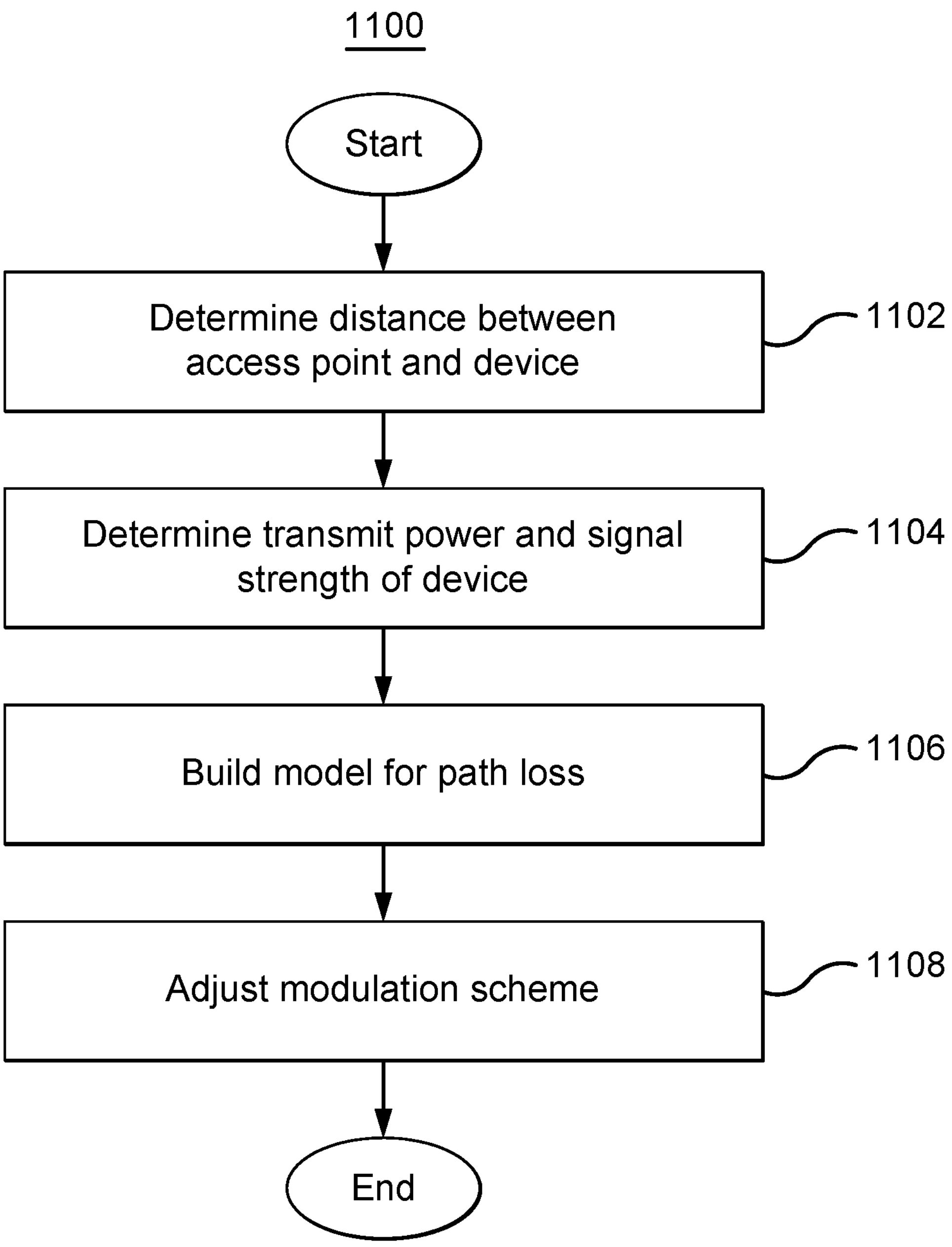
FIG. 11 is a flowchart of an example method performed in the system of FIG. 1.

FIG. 11 is a flowchart of an example method 1100 performed in the system 100 of FIG. 1. In particular embodiments, the access point 104 or the controller 106 perform the method 1100. By performing the method 1100, the access point 104 or the controller 106 adjusts the modulation scheme 1008 of the access point 104 or the device 102.

In block 1102, the access point 104 or the controller 106 determine a distance 314 between the access point 104 and the device 102. The access point 104 or the controller 106 may determine the distance 314 using FTM signaling, as shown in FIG. 3. In block 1104, the access point 104 or the controller 106 determine the transmit power 1002 and the signal strength 1004 of the device 102. The signal strength 1004 may take the form of a reported RSSI of the device 102.

In block 1106, the access point 104 or the controller 106 builds the model 1006 for path loss. The model 1006 may indicate a path loss for the device 102, and the model 1006 may provide an explanation for an observed path loss for the device 102. The access point 104 or the controller 106 may use the model 1006 to predict the path loss of the device 102 at a certain time.

In block 1108, the access point 104 or the controller 106 adjusts the modulation scheme 1008 of the access point 104 or the device 102 based on the predictions made using the model 1006. For example, the access point 104 or the controller 106 may predict a path loss for the device 102 using the model 1006. The access point 104 or the controller 106 may then adjust the modulation scheme 1008 of the access point 104 or the device 102 based on the predicted path loss at a future time. The modulation scheme 1008 may allow for successful communication between the access point 104 and the device 102 despite the path loss.

Figure 12:
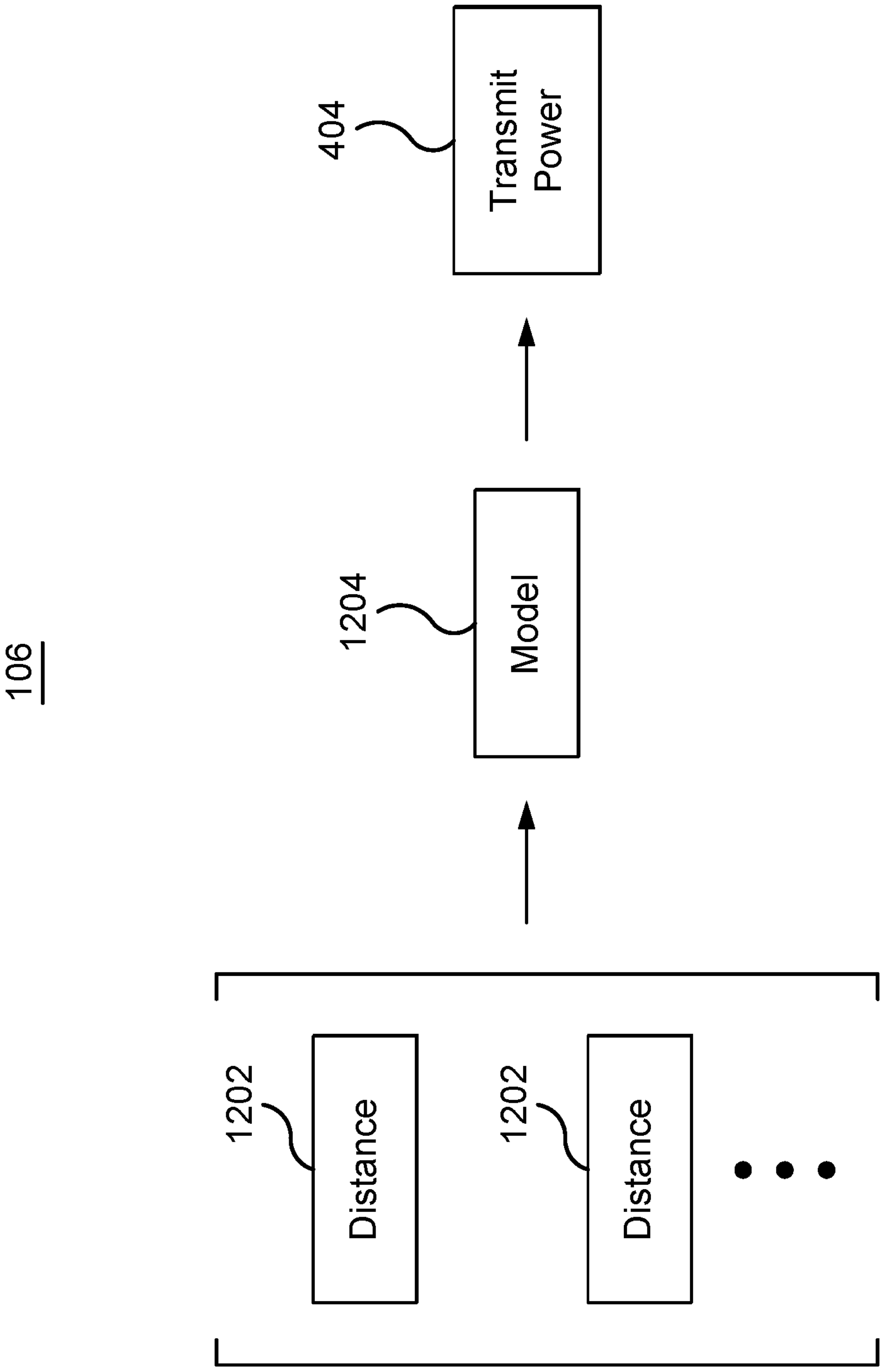
FIG. 12 illustrates an example controller in the system of FIG. 1.

FIG. 12 illustrates an example controller 106 in the system 100 of FIG. 1. Generally, FIG. 12 shows the controller 106 adjusting the transmit power 404 of an access point 104 based on the distances between the access point 104 and other access points 104.

The controller 106 may adjust the transmit power 404 to compensate for low RSSIs when the access point 104 is operating in low power mode and when a device 102 is selecting an access point 104 for connection. In this manner, the controller 106 may allow for access points 104 operating in a low power mode to be considered fairly by the device 102 for connection.

The controller 106 determines distances 1202 between access points 104. The distances 1202 may be determined using FTM signaling, as shown in FIG. 3. Generally, the access points 104 may communicate FTM signals and acknowledgements between each other and track the times when the FTM messages and acknowledgements were sent and received. Using these times, the controller 106 may determine the distances 1202 between the access points 104.

In some embodiments, the access points 104 or the controller 106 may also determine the distances 314 between the device 102 and the access points 104. The controller 106 may consider the distance 1202 and/or the distances 314 when adjusting the transmit power 404 of an access point 104. For example, using these distances 1202 and 314, the controller 106 may determine how far the device 102 is from each access point 104.

The controller 106 may build a model 1204 using the distances 1202 between the access points 104 and/or the distances 314 between the device 102 and the access points 104. The model 1204 may indicate a path loss between the access points 104 and the device 102. The controller 106 may use the model 1204 to determine the path losses between the device 102 and the access points 104 and an explanation for the path losses.

The controller 106 may adjust the transmit power 404 of an access point 104 based on the predictions made using the model 1204 or based on the distances 1202 or the distances 314. For example, the controller 106 may determine that the RSSI between the device 102 and the access point 104 may be low even though the device 102 is close to the access point 104, because the access point 104 is operating in a low power mode. As a result, the device 102 may not fairly consider the access point 104 for connection if the device 102 bases its connection decision on the RSSI. In response, the controller 106 may increase the transmit power 404 of the access point 104 to increase the RSSI of the device 102 and the access point 104. In this manner, the device 102 may fairly consider the access point 104 for connection. In some embodiments, the controller 106 may increase the transmit power 404 of the access point 104 based on the distance 314 between the access point 104 and the device 102. The closer the device 102 is to the access point 104, the more the controller 106 may increase the transmit power 404 of the access point 104. In some embodiments, controller 106 may increase the RSSI without necessarily increasing the transmit power of the access point 104. For example, a controller 106 may instruct the device 102 to adjust or increase the RSSI detected by the device 102 with respect to the access point 104.

Figure 13:
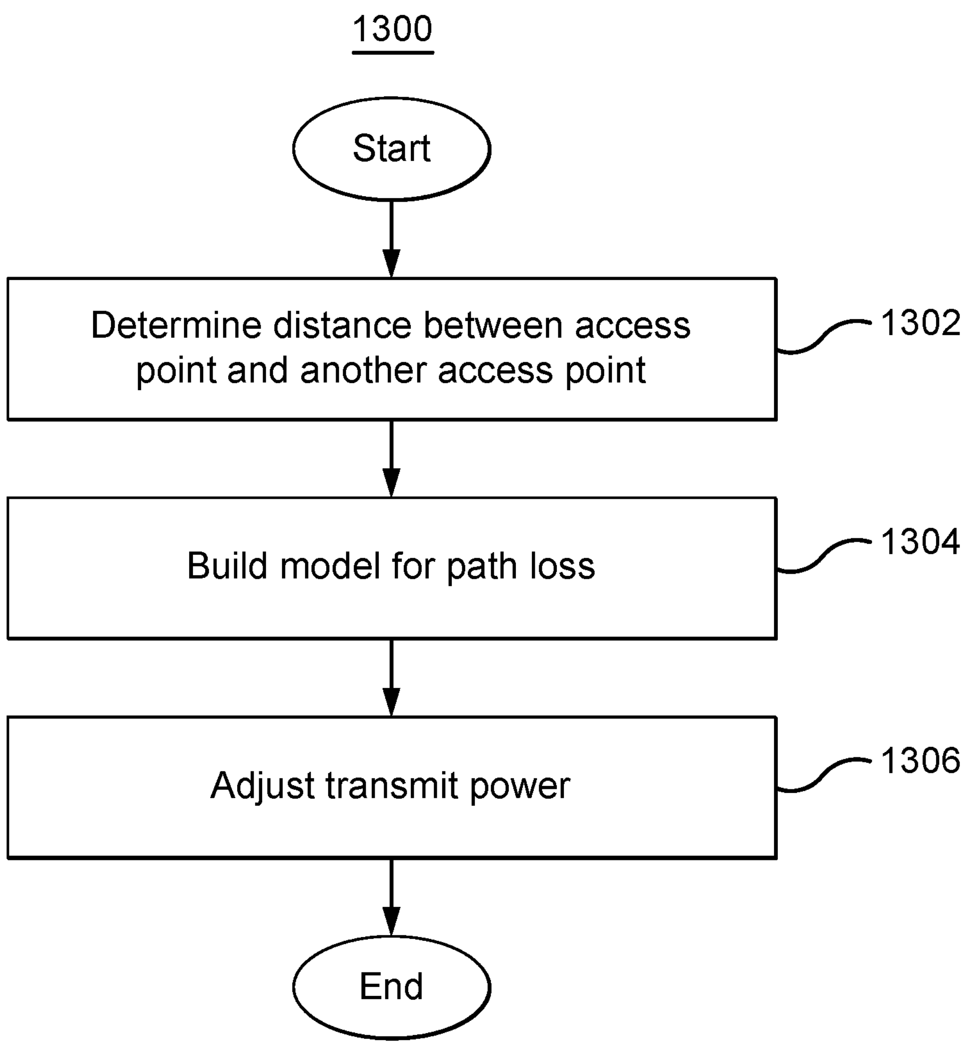
FIG. 13 is a flowchart of an example method performed in the system of FIG. 1.

FIG. 13 is a flowchart of an example method 1300 performed in the system 100 of FIG. 1. In particular embodiments, the access point 104 or the controller 106 perform the method 1300. By performing the method 1300, the access point 104 or the controller 106 adjusts the transmit power of the access point 104 when a device 102 is selecting an access point 104 for connection.

In block 1302, the access point 104 or the controller 106 determines distances 1202 between the access point 104 and other access points 104. The access point 104 or the controller 106 may use FTM signaling to determine the distances 1202, as shown in FIG. 3. In some embodiments, the access points 104 or the controller 106 may also determine distances 314 between the access point 104 and a device 102 using FTM signaling.

In block 1304, the access point 104 or the controller 106 builds the model 1204 for path loss using the determined distances 1202 and/or the determined distances 314. The model 1204 may be used to predict path loss for the device 102 or an explanation for observed path loss for the device 102.

In block 1306, the access point 104 or the controller 106 adjusts the transmit power 404 of the access point 104 when the device 102 is selecting an access point 104 for consideration. If the access point 104 is operating in low power mode, then the device 102 may have a low RSSI for the access point 104 even though the access point 104 may be closest to the device 102. To steer the device 102 towards that access point 104, the access point 104 or the controller 106 may increase the transmit power 404 of the access point 104 so that the device 102 determines a higher RSSI for that access point 104. In some embodiments, the access point 104 or the controller 106 may instruct the device 102 to increase or adjust the detected RSSI. As a result, the device 102 may fairly consider the access point 104 even though the access point 104 is operating in the low power mode.

In summary, a wireless network uses FTM to determine distances between access points 104 or distances between access points 104 and client devices 102. The wireless network may then use these determined distances to manage the power used by the access points 104 in the network. For example, the distances may be used to determine when to switch certain access point 104 from operating in a standard power mode to a low power mode. As another example, the distances may be used to determine when to steer devices 102 to access points 104 operating in a low power mode. As yet another example, the distances may be used to determine what modulation scheme an access point 104 should use. In some embodiments, the wireless network conserves electric power by switching certain access points 104 to the low power mode when possible.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," or "at least one of A or B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function (s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method comprising:

determining, based on (i) a transmit time and a receive time of a timing message from a first access point (AP) transmitting at a first power level in a first power mode to a client device and (ii) a transmit time and a receive time of an acknowledgment of the timing message from the client device to the first AP, a distance between the first AP and the client device;

determining, based at least in part on the distance between the first AP and the client device, that the client device is positioned in a coverage hole;

increasing, based on determining that the client device is positioned in the coverage hole, a transmit power of the first AP to a second power level in the first power mode;

redetermining, in response to increasing the transmit power of the first AP, that the client device is positioned in the coverage hole;

adjusting, based at least in part on redetermining that the client device is positioned in the coverage hole, a power mode of the first AP from the first power mode in which the first AP transmits at the second power level to a second power mode in which the first AP transmits at a third power level that is higher than the first and second power levels.

2. The method of claim 1, further comprising adjusting, based at least in part upon a history of a number of client devices connected to the first AP, the power mode of the first AP from the first power mode to the second power mode.

3. The method of claim 1, further comprising adjusting a modulation scheme of the first AP based at least in part on the distance between the first AP and the client device.

4. The method of claim 1, further comprising:

determining, based on (i) a transmit time and a receive time of a timing message from the first AP to a second AP and (ii) a transmit time and an acknowledgment of the timing message from the second AP to the first AP, a distance between the first AP and the second AP; and adjusting, at the first AP, a received signal strength indicator (RSSI) of the second AP based at least in part on the distance between the first AP and the second AP.

5. The method of claim 1, wherein the second power level corresponds to a maximum power level of the first AP in the first power mode.

6. The method of claim 5, wherein the third power level corresponds to a maximum power level of the first AP in the second power mode.

7. A system comprising:

a memory; and a processor communicatively coupled to the memory, the processor configured to:

determine, based on (i) a transmit time and a receive time of a timing message from a first access point (AP) transmitting at a first power level in a first power mode to a client device and (ii) a transmit time and a receive time of an acknowledgment of the timing message from the client device to the first AP, a distance between the first AP and the client device;

determine, based at least in part on the distance between the first AP and the client device, that the client device is positioned in a coverage hole;

increase, based on determining that the client device is positioned in the coverage hole, a transmit power of the first AP to a second power level in the first power mode;

redetermine, in response to increasing the transmit power of the first AP, that the client device is positioned in the coverage hole; and adjust, based at least in part on redetermining that the client device is positioned in the coverage hole, a power mode of the first AP from the first power mode in which the first AP transmits at the second power level to a second power mode in which the first AP transmits at third power level that is higher than the first and second power levels.

8. The system of claim 7, wherein the processor is further configured to adjust, based at least in part upon a history of a number of client devices connected to the first AP, the power mode of the first AP from the first power mode to the second power mode.

9. The system of claim 7, wherein the processor is further configured to adjust a modulation scheme of the first AP based at least in part on the distance between the first AP and the client device.

10. The system of claim 7, wherein the processor is further configured to:

determine, based on (i) a transmit time and a receive time of a timing message from the first AP to a second AP and (ii) a transmit time and an acknowledgment of the timing message from the second AP to the first AP, a distance between the first AP and the second AP; and adjust, at the first AP, a received signal strength indicator (RSSI) of the second AP based at least in part on the distance between the first AP and the second AP.

* * * * *